US012639912B2

(12) United States Patent
　　Choi et al.

(10) Patent No.: US 12,639,912 B2
(45) Date of Patent: May 26, 2026

---

(54) ELECTRONIC DEVICE INCLUDING CAMERA MODULE AND METHOD FOR OPERATING ELECTRONIC DEVICE

(71) Applicant: Samsung Electronics Co., Ltd., Suwon-si (KR)

(72) Inventors: Woojhon Choi, Suwon-si (KR); Wonjoon Do, Suwon-si (KR); Jaesung Choi, Suwon-si (KR); Alok Shankarlal Shukla, Bangalore (IN); Manoj Kumar Marramreddy, Bangalore (IN); Saketh Sharma, Bangalore (IN); Hamid Rahim Sheikh, Mountain View, CA (US); John Seokjun Lee, Mountain View, CA (US); Akira Osamoto, Mountain View, CA (US); Yibo Xu, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 18/305,211

(22) Filed: Apr. 21, 2023

(65) Prior Publication Data
　　　US 2023/0267702 A1　　Aug. 24, 2023

Related U.S. Application Data

(63) Continuation of application No. PCT/KR2022/004526, filed on Mar. 30, 2022.

(30) Foreign Application Priority Data

Jun. 10, 2021　(KR) ........................ 10-2021-0075524

(51) Int. Cl.
　　*G06V 10/60*　　　(2022.01)
　　*G06T 5/50*　　　(2006.01)
　　　　　　(Continued)

(52) U.S. Cl.
　　CPC ................ *G06V 10/60* (2022.01); *G06T 5/50* (2013.01); *H04N 23/675* (2023.01); (Continued)

(58) Field of Classification Search
　　None
　　See application file for complete search history.

(56) References Cited

U.S. PATENT DOCUMENTS

| 7,764,319 | B2 | 7/2010 | Fukumoto |
| 8,982,963 | B2 | 3/2015 | Gish et al. |
(Continued)

FOREIGN PATENT DOCUMENTS

| DE | 102019209152 A1 * | 12/2020 | ........... G06V 20/584 |
| JP | 2009-303061 A | 12/2009 | |
(Continued)

OTHER PUBLICATIONS

Korean Office Action dated Aug. 14, 2025, issued in a Korean Patent Application No. 10-2021-0075524.
(Continued)

*Primary Examiner* — Jiangeng Sun
(74) *Attorney, Agent, or Firm* — Jefferson IP Law, LLP

(57) ABSTRACT

An electronic device is provided. The electronic device includes a display, a camera module disposed under the display, and a processor electrically connected to the display and the camera module. The processor is configured to acquire a sample frame by using the camera module, identify whether a light source object is included in the sample frame, determine an imaging parameter for acquisition of first multiple frames when the light source object is identified to be included in the sample frame, acquire multiple frames, based on the imaging parameter, composite the multiple frames to generate a composite frame, identify an attribute of the light source object included in the composite (Continued)

frame, and perform frame correction of the composite frame, based on the identified attribute.

20 Claims, 9 Drawing Sheets

(51) Int. Cl.
    *H04N 23/67*         (2023.01)
    *H04N 23/73*         (2023.01)

(52) U.S. Cl.
    CPC ... *H04N 23/73* (2023.01); *G06T 2207/20084* (2013.01); *G06T 2207/20221* (2013.01)

(56) References Cited

U.S. PATENT DOCUMENTS

| | | | | |
|---|---|---|---|---|
| 10,410,321 | B2 * | 9/2019 | Ilic | ................... G06T 3/4038 |
| 10,609,298 | B2 | 3/2020 | Duran et al. | |
| 10,750,147 | B2 | 8/2020 | Jiang et al. | |
| 11,082,626 | B2 | 8/2021 | Fujimoto | |
| 2019/0246018 | A1 | 8/2019 | Rho et al. | |

| | | | | |
|---|---|---|---|---|
| 2020/0382689 | A1 * | 12/2020 | Oh | ................... H04N 23/611 |
| 2021/0029336 | A1 | 1/2021 | Liu et al. | |
| 2022/0353401 | A1 | 11/2022 | Do et al. | |

FOREIGN PATENT DOCUMENTS

| | | | | | |
|---|---|---|---|---|---|
| JP | 2010-063036 | A | | 3/2010 | |
| JP | 4931227 | B2 | | 5/2012 | |
| JP | 6232808 | B2 | | 11/2017 | |
| JP | 2018-019436 | A | | 2/2018 | |
| JP | 2018-148281 | A | | 9/2018 | |
| JP | 2019004203 | A | * 1/2019 | ............... G06T 5/50 |
| KR | 10-2018-0026288 | A | | 3/2018 | |
| KR | 10-2020-0092165 | A | | 8/2020 | |
| KR | 10-2020-0137918 | A | | 12/2020 | |
| KR | 20200137918 | A | * 12/2020 | ........... A61B 5/7203 |
| KR | 10-2022-0014764 | A | | 2/2022 | |
| KR | 10-2022-0078191 | A | | 6/2022 | |

OTHER PUBLICATIONS

International Search Report dated Jul. 22, 2022, issued in International Application No. PCT/KR2022/004526.

* cited by examiner

Electronic Device (101)

530

640, 650

IDENTIFY BRIGHTNESS OF LIGHT SOURCE
OBJECT INCLUDED IN COMPOSITE FRAME ~710

IDENTIFY ARTIFACT INFORMATION BY
SOURCE OBJECT IN COMPOSITE FRAME ~720

DETERMINE FRAME CORRECTION METHOD,
BASED ON IDENTIFIED BRIGHTNESS AND
ARTIFACT INFORMATION ~730

PERFORM FRAME CORRECTION OF COMPOSITE
FRAME, BASED ON DETERMINED FRAME
CORRECTION METHOD ~740

END

ELECTRONIC DEVICE INCLUDING CAMERA MODULE AND METHOD FOR OPERATING ELECTRONIC DEVICE

CROSS-REFERENCE TO RELATED APPLICATION(S)

This application is a continuation application, claiming priority under § 365(c), of an International application No. PCT/KR2022/004526, filed on Mar. 30, 2022, which is based on and claims the benefit of a Korean patent application number 10-2021-0075524, filed on Jun. 10, 2021, in the Korean Intellectual Property Office, the disclosure of which is incorporated by reference herein in its entirety.

TECHNICAL FIELD

The disclosure relates to an electronic device including a camera module. More particularly, the disclosure relates to a technology for solving an optical problem caused by an under display camera (UDC) structure.

BACKGROUND ART

In line with increasing use of cameras of electronic devices to acquire various images and to utilize the acquired images to various content, various technologies have been developed to acquire image of higher quality in connection with the structure and operation of electronic devices.

An under display camera (UDC) is disposed under a display, and an electronic device including a UDC may effectively utilize the area of the display by displaying content in a larger area than when a camera is disposed on the front surface of the display.

In addition, there have been various kinds of development in terms of hardware and/or software to solve problems such as optical diffraction or transmissivity resulting from a shielding structure formed by a display of an electronic device including a UDC.

The above information is presented as background information only to assist with an understanding of the disclosure. No determination has been made, and no assertion is made, as to whether any of the above might be applicable as prior art with regard to the disclosure.

DISCLOSURE

Technical Problem

According to the related art, there is a problem in that, since a camera is disposed under a display having a shielding structure, light incident from the outside is diffracted, thereby decreasing the transmissivity.

According to the related art, optical diffraction and/or low transmissivity may cause decreased resolution of images acquired through the camera, signal-to-noise ratio (SNR) degradation, starburst and glare, or an artifact.

Aspects of the disclosure are to address at least the above-mentioned problems and/or disadvantages and to provide at least the advantages described below. Accordingly, an aspect of the disclosure is to provide an electronic device having a UDC structure which acquires high-quality images efficiently through software processing corresponding to each scenario.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display, a camera module disposed under the display, and a processor electrically connected to the display and the camera module, wherein the processor is configured to acquire a sample frame by using the camera module, identify whether a light source object is included in the sample frame, determine a first imaging parameter for acquisition of first multiple frames when the light source object is identified to be included in the sample frame, acquire first multiple frames, based on the first imaging parameter, composite the first multiple frames to generate a first composite frame, identify an attribute of the light source object included in the first composite frame, and perform first frame correction of the first composite frame, based on the identified attribute.

In accordance with another aspect of the disclosure, a method for operating an electronic device is provided. The electronic device includes a display, a camera module disposed under the display, and a processor electrically connected to the display and the camera module. The method includes acquiring a sample frame by using the camera module, identifying whether a light source object is included in the sample frame, determining a first imaging parameter for acquisition of first multiple frames when the light source object is identified to be included in the sample frame, acquiring first multiple frames, based on the first imaging parameter, compositing the first multiple frames to generate a composite frame, identifying an attribute of the light source object included in the first composite frame, and performing frame correction of the composite frame, based on the identified attribute.

Advantageous Effects

According to various embodiments of the disclosure, improved images may be obtained by preventing reduction in resolution of images acquired through a camera due to a UDC structure, or SNR degradation, and by removing starburst and glare, or the occurrence of an artifact.

According to various embodiments of the disclosure, scenarios corresponding to respective environments in which images are acquired may be applied such that the electronic device operates adaptively to an environment change, thereby obtaining high-quality images based on scenarios appropriate for respective environments.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
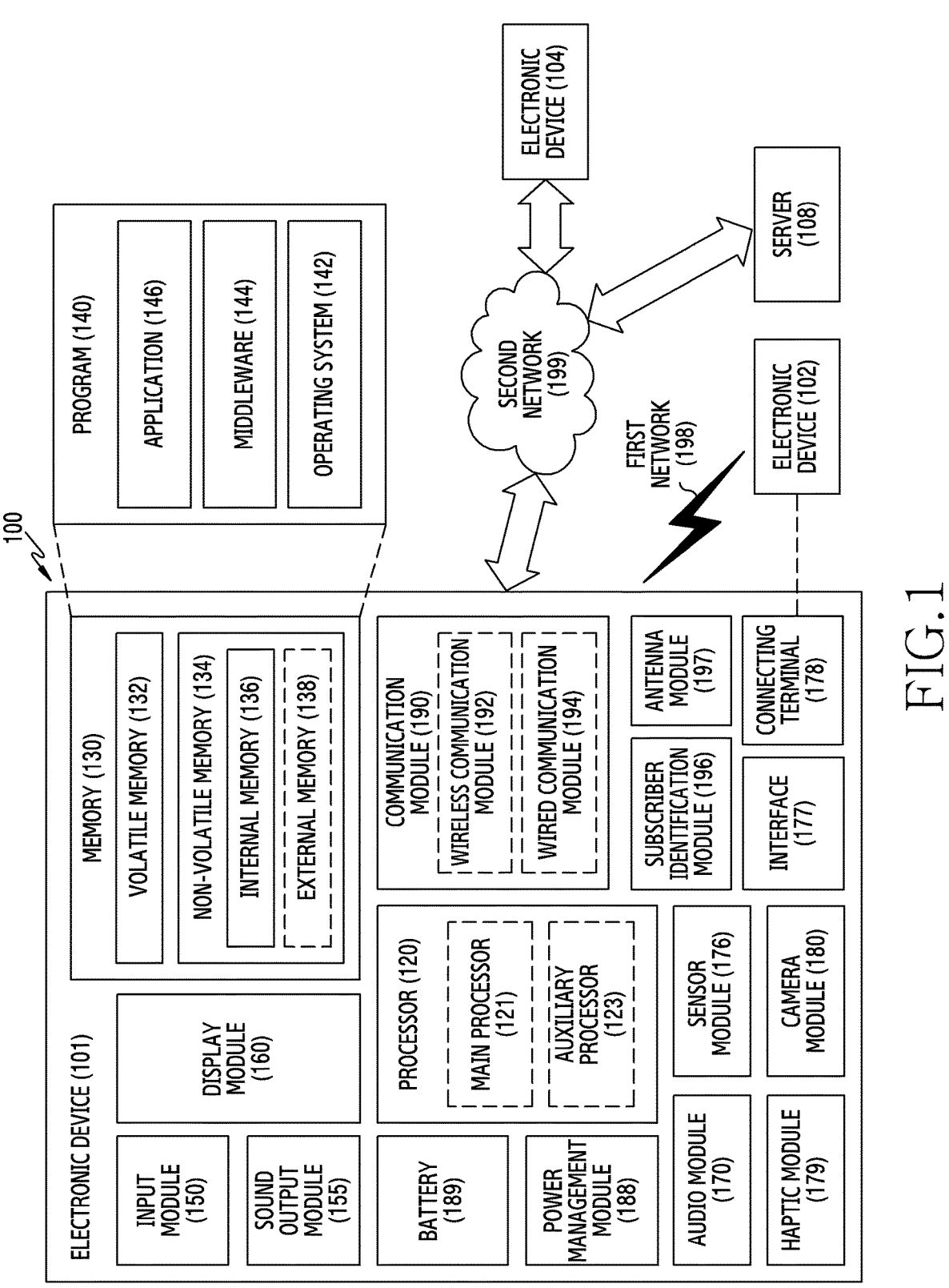
FIG. 1 is a block diagram of an electronic device in a network environment according to an embodiment of the disclosure.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence (AI) model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
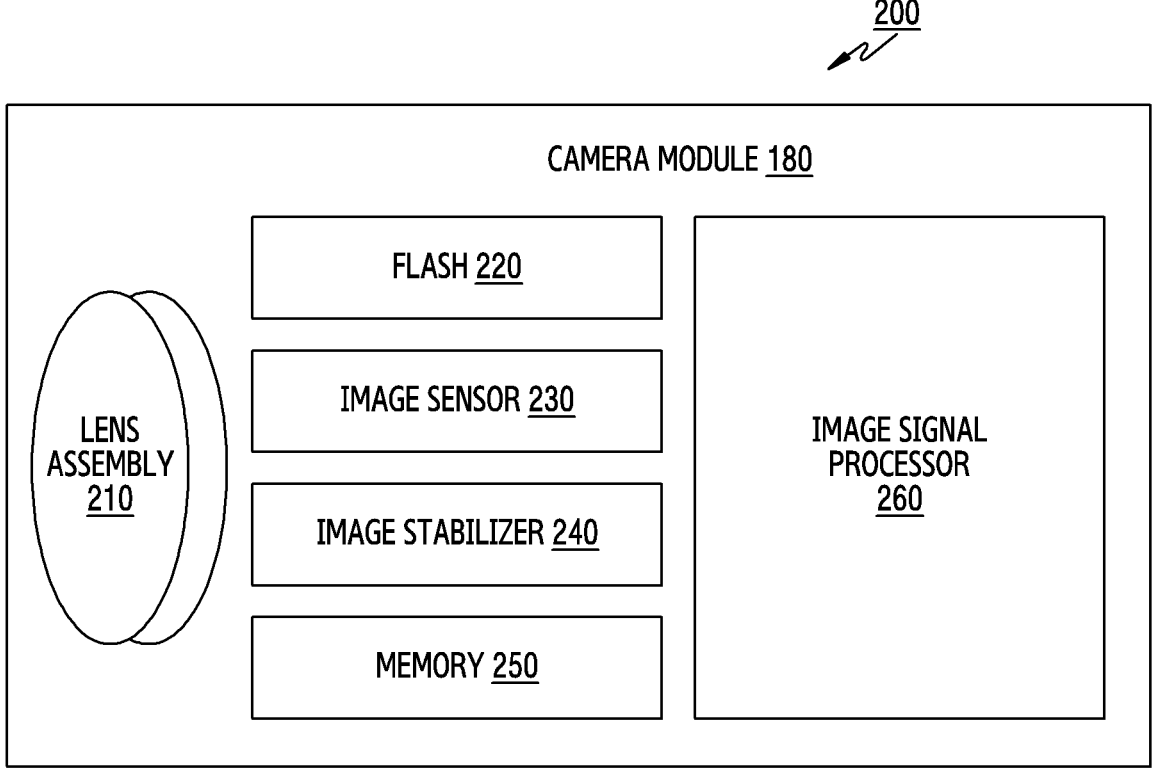
FIG. 2 is a block diagram illustrating a camera module according to an embodiment of the disclosure.

FIG. 2 is a block diagram 200 illustrating the camera module 180 according to various embodiments of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. The camera module 180 may include a plurality of lens assemblies 210. In such a case, the camera module 180 may form a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of the other lens assemblies. The lens assembly 210 may include, for example, a wide-angle lens or a telephoto lens.

The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include an image sensor selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. The image stabilizer 240 may sense such a movement by the camera module 180 or the electronic device 101 using a gyro sensor (not shown) or an acceleration sensor (not shown) disposed inside or outside the camera module 180. According to an embodiment of the disclosure, the image stabilizer 240 may be implemented as an optical image stabilizer.

The memory 250 may store, at least temporarily, at least part of an image obtained via the image sensor 230 for a subsequent image processing task. For example, if image capturing is delayed due to shutter lag or multiple images are captured quickly, a raw image obtained (e.g., a Bayer-patterned image, a high-resolution image) may be stored in the memory 250, and a corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. The memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment of the disclosure, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

The electronic device 101 may include a plurality of camera modules 180 having different attributes or functions.

In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
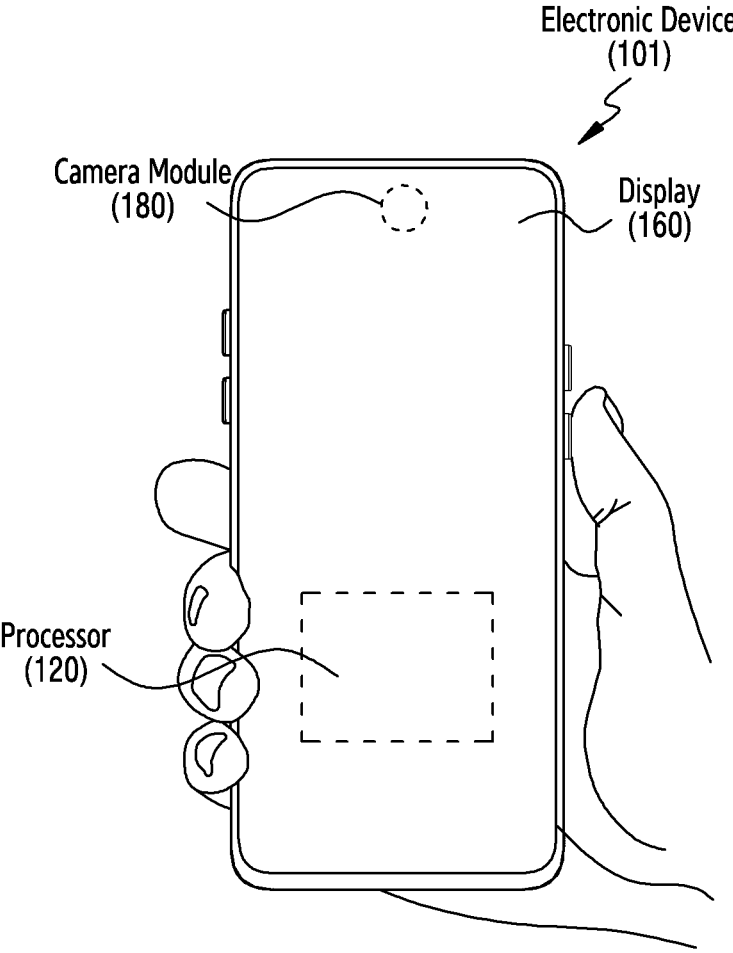
FIG. 3 schematically illustrates an under-display camera (UDC) structure of an electronic device according to an embodiment of the disclosure.

FIG. 3 schematically illustrates an under-display camera (UDC) structure of an electronic device according to an embodiment of the disclosure.

Referring to FIG. 3, an electronic device 101 may include a processor 120. For example, the processor 120 may be electrically connected to a display (e.g., the display module 160 and the camera module 180 in FIG. 1), and may control operations of the display 160 and the camera module 180.

The display 160 may be disposed on the front surface of the electronic device 101. For example, a bezel structure may form the edge of the side surface of the electronic device 101, and the display 160 may be disposed in a region which corresponds to a region other than the bezel structure in the entire region of the front surface of the electronic device 101.

The camera module 180 may be disposed under the display 160. For example, the display 160 may be disposed parallel to a plane on the x axis and the y axis, and the camera module 180 may be disposed in the −z-axis direction with reference to the display 160. The camera module 180 may be covered with the display 160, and thus may not be viewed from outside.

Light outside the electronic device 101 may pass through at least a part of the display 160 and may be incident on the camera module 180. For example, light outside the electronic device 101 may pass through the region of the display 160 corresponding to a region in which the camera module 180 is disposed, and may be incident on the camera module 180.

When light outside the electronic device 101 passes through the display 160 and is incident on the camera module 180, light in which diffraction has occurred may be incident on the camera module 180.

When external light passes through the display 160 and is incident on the camera module 180, the transmissivity of the light may be lower than when the external light is directly incident on the camera module 180.

Figure 4:
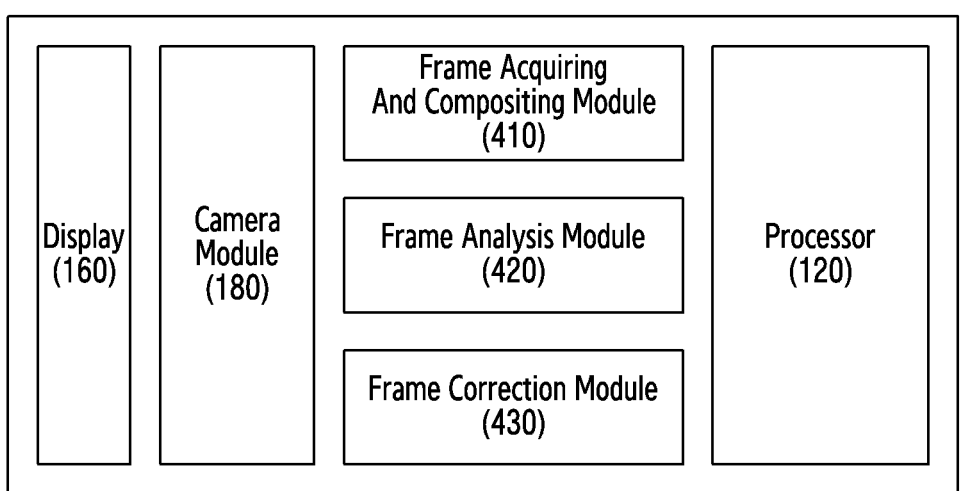
FIG. 4 schematically illustrates elements of an electronic device according to an embodiment of the disclosure.

FIG. 4 schematically illustrates elements of an electronic device according to an embodiment of the disclosure.

Referring to FIG. 4, an electronic device 101 may include a processor 120, a display 160, and/or a camera module 180.

The processor 120 may at least control operations of the display 160 and/or the camera module 180. For example, as shown in FIG. 4, the processor 120 may control operations of a frame acquiring and compositing module 410, a frame analysis module 420, and/or a frame correction module 430, described below.

According to an embodiment of the disclosure, the frame acquiring and compositing module 410, the frame analysis module 420, and/or the frame correction module 430 may not be necessarily separate in hardware, and may be implemented in software.

The electronic device 101 may include the frame acquiring and compositing module 410, the frame analysis module 420, and/or the frame correction module 430.

The frame acquiring and compositing module 410 may perform an operation for improving a signal-to-noise ratio (SNR).

When the camera module 180 is disposed under the display 160, the transmissivity of light may be reduced. The frame acquiring and compositing module 410 may improve SNR degradation due to the reduction of light transmissivity.

The frame acquiring and compositing module 410 may include a network for acquiring multiple frames and compositing the acquired multiple frames to generate a composite frame having a high SNR.

When the frame acquiring and compositing module 410 determines, based on frame analysis by the frame analysis module 420, that there is a need to acquire multiple frames, then the frame acquiring and compositing module 410 may determine an imaging parameter necessary for acquisition of multiple frames. For example, the imaging parameter may include an exposure value (EV), an exposure time, a shutter speed, an aperture value, a focal region, a color temperature, sensitivity (international standard organization (ISO)), and/or the number (N) of multiple frames.

The frame acquiring and compositing module 410 may acquire multiple frames, based on the determined imaging parameter (e.g., the exposure value, the exposure time, the shutter speed, the aperture value, the focal region, the color temperature, the sensitivity, and/or the number (N) of multiple frames).

The frame acquiring and compositing module 410 may composite the multiple frames, based on the acquired multiple frames. For example, the frame acquiring and compositing module 410 may extract identical frame regions, which are determined to be identical regions, from multiple frames, and may composite the multiple frames, based on the extracted identical frame regions, thereby generating a composite frame. The composite frame may be a frame having a more improved SNR than each of the multiple frames.

The multiple frames may be frames (e.g., high dynamic range (HDR) frames) to which a high dynamic range (HDR) is applied.

An HDR frame may be a frame in which multiple frames, which the electronic device 101 has acquired in different brightness by adjusting exposure according to control of the processor 120, are combined into a single frame to minimize a pixel saturation region and widen a dynamic range.

When it is determined, based on the frame analysis by the frame analysis module 420, that there is no need to acquire multiple frames, the frame acquiring and compositing module 410 may not composite multiple frames.

The above-mentioned operations of the frame acquiring and compositing module 410 may be performed in a Bayer domain, a YUV domain, or an RGB domain.

A frame may refer to an image frame (or an image).

The frame analysis module 420 may identify and/or classify attributes of an acquired sample frame, multiple frames, and/or a composite frame.

The frame analysis module 420 may identify and/or classify, based on a signal processing algorithm and/or artificial neural network (AI network), the presence or absence of a light source object in an acquired target frame (e.g., a sample frame, multiple frames, and/or a composite frame), whether illuminance is low, the brightness of the light source object, the presence or absence of an artifact (e.g., a flare artifact, a rainbow artifact, or a light source halo artifact).

The sample frame may be at least one frame that the electronic device 101 acquires in real time through the camera module 180 according to control of the processor 120.

The multiple frames may be frames that the electronic device 101 acquires in real time through the camera module 180 according to control of the processor 120. Alternatively, the multiple frames may be a set of sample frames.

The composite frame may be a frame obtained by combining multiple frames that the electronic device 101 has acquired under control of the processor 120.

Operations of the electronic device 101 regarding a sample frame, multiple frames and/or a composite frame are described below.

In relation to an operation of acquiring a target frame (e.g., a sample frame, multiple frames, or a composite frame), the saturation of a pixel value may be caused by the limitation of a dynamic range, and the frame analysis module 420 may identify a state in which the form and/or color of a light source is distorted by starburst and glare around the light source object in the acquired target frame.

In relation to the operation of acquiring a target frame (e.g., a sample frame, multiple frames, or a composite frame), the frame analysis module 420 may identify that the high-brightness light source object exists in a designated position while being included in the target frame. The frame analysis module 420 may identify, for example, a grid-patterned artifact (e.g., a flare artifact) caused by optical diffraction which is caused by the structure of a display (e.g., the display 160) disposed above a camera module (e.g., the camera module 180). Furthermore, when the high-brightness light source object is included in the target frame, the frame analysis module 420 may also identify a rainbow artifact in which color around the light source object is distorted by the saturation of a pixel value of an image sensor (e.g., the image sensor 230 in FIG. 2) of the camera module (e.g., the camera module 180.

The frame analysis module 420 may identify the presence or absence of the light source object in a target frame (e.g., a sample frame, multiple frames, and/or composite frame), based on a region in which a pixel value (e.g., a pixel value of the image sensor 230) is saturated based on a signal processing algorithm and/or an artificial neural network (AI network).

The frame analysis module 420 may identify whether the illuminance of an environment in which a target frame (e.g., a sample frame, multiple frames, and/or a composite frame) has been acquired is less than a threshold value (or whether the illuminance is low). For example, the frame analysis module 420 may analyze a target frame (e.g., a sample frame, multiple frames, and/or a composite frame) to identify whether the illuminance is low. In another example, the frame analysis module 420 may use imaging information (shutter speed, aperture, image sensitivity, etc.) or information acquired using a sensor (e.g., the sensor module 176 in FIG. 1) (e.g., an illuminance sensor, global positioning system. (GPS), etc.) to identify whether the illuminance is low.

The frame analysis module 420 may identify the degree of starburst and/or glare, based on a region in which a pixel value (e.g., the pixel value of the image sensor 230) is saturated based on a signal processing algorithm and/or an artificial neural network (AI network). Furthermore, the frame analysis module 420 may identify the degree of starburst and/or glare, based on the algorithm and/or the AI network, thereby identifying the brightness (or intensity) of the light source object.

The frame analysis module 420 may identify and/or classify, based on a signal processing algorithm and/or an artificial neural network (AI network), whether there is an artifact in a target frame (e.g., a sample frame, multiple frames, and/or a composite frame). For example, when a light source object having brightness equal to or higher a predetermined level exists in a designated position while being included in an acquired target frame, an artifact due to a UDC structure may exist in the acquired target frame. In this case, the frame analysis module 420 may detect, based on the signal processing algorithm and/or the artificial neural network (AI network), the artifact existing in the target frame. Furthermore, the frame analysis module 420 may analyze and/or identify the position of the light source object in the target frame, thereby indirectly detecting the artifact.

The brightness of the light source object, which is equal to or higher the predetermined level, may be a relative brightness. For example, the brightness may be a relative brightness based on an exposure value, a shutter speed, or sensitivity (ISO).

The frame analysis module 420 may also include multiple submodules (not shown) capable of identifying and/or classifying the presence or absence of a light source object, whether illuminance is low, the brightness of the light source object, or the presence or absence of an artifact. For example, the frame analysis module 420 may include multiple submodules such as a light identification module, an illuminance identification module, a brightness identification module, or an artifact identification module, and may identify and/or classify attributes of an acquired target frame, based on the result of analysis and/or identification by the multiple submodules.

The frame analysis module 420 identify and/or classify serially (sequentially) or in parallel (substantially simultaneously), based on a signal processing algorithm and/or a network (e.g., an artificial neural network AI network)), the presence or absence of a light source object in an acquired target frame (e.g., a sample frame, multiple frames, and/or a composite frame), whether the illuminance thereof is low, the brightness of the light source object, or the presence or absence of an artifact.

The operation, in which the frame analysis module 420 identifies and/or classifies the presence or absence of a light source object in the acquired target frame (e.g., a sample frame, multiple frames, and/or a composite frame), whether the illuminance thereof is low, the brightness of the light source object, or the presence or absence of an artifact, may be performed during or after acquisition of the target frame according to the setting by a user.

The frame correction module 430 may perform a frame correction operation for a sample frame and/or a composite frame.

The frame correction module 430 may perform an operation for processing an effect of optical diffraction on the sample frame and/or composite frame. For example, the frame correction module 430 may perform an operation of processing an effect according to optical diffraction, based on a network trained through a data set including a frame, in which an effect according to the diffraction is present, and including a frame, in which an effect according to the diffraction is not present.

When a light source object is identified in the acquired sample frame and/or composite frame, the frame correction module 430 may generate, based on an acquired HDR frame (or an HDR-processed frame), information about the shape and color of the light source object. The frame correction module 430 may use the information about the shape and color of the light source object to perform frame correction (e.g., restore the shape or color of the light source object).

The frame correction module 430 may perform a frame correction operation based on the analysis made by the frame analysis module 420.

The frame correction module 430 may include a signal processing algorithm and/or an artificial neural network (AI network) for frame correction. For example, an artificial neural network (ANN) may be included in a correction-related signal processing algorithm of the frame correction module 430 for frame correction. In another example, a network model to be used in the frame correction module 430 may also be determined based on the identification and/or classification by the frame analysis module 420. Furthermore, the frame correction module 430 may perform a frame correction operation through multiple networks, based on the identification and/or classification by the frame analysis module 420.

The frame correction module 430 may include a signal processing algorithm for SNR improvement and/or a signal processing algorithm for removal of an artifact. The algorithms may be formed in a Bayer domain, a YUV domain, or an RGB domain.

The frame correction module 430 may remove, based on the analysis by the frame analysis module 420, an artifact included in a sample frame and/or a composite frame. For example, the frame analysis module 420 may determine the type of artifact which is to be removed for frame correction, and thus may determine a signal processing algorithms and/or an AI network (artificial neural network) for the removal of the artifact. Furthermore, the frame analysis module 420 may also determine, based on the types and/or the number of artifacts, multiple signal processing algorithms and/or networks (artificial neural networks).

The signal processing algorithms and/or the networks (the artificial neural networks) may be performed in a Bayer domain, a YUV domain, or an RGB domain.

The processor 120 or an image signal processor 260 may perform tuning of basic color, brightness, or contrast, such as demosaicing, gamma correction, auto white balance (AWB), or color correction, with respect to an acquired target frame (e.g., a sample frame or a composite frame) of the Bayer domain, thereby generating a frame of the Bayer domain, the YUV domain, or the RGB domain.

For convenience of description, the above-mentioned operation of the processor 120 or the image signal processor 260 may be called "frame tuning". The "frame tuning" may be performed by the frame correction module 430.

The processor 120 or the image signal processor 260 may further perform a processing operation, such as SNR improving, sharpness adjusting, or distortion mitigating, with respect to a target frame (e.g., a sample frame or a composite frame).

Based on a user setting, operations of the frame analysis module 420 and/or the frame correction module 430 may be performed during acquisition of the sample frame and/or the composite frame, or may be performed after acquisition of the sample frame and/or the composite frame.

The frame analysis module 420 and/or the frame correction module 430 may operate based on at least some signal processing algorithms and/or networks (artificial neural networks) trained through machine learning.

If the frame analysis module 420 and/or the frame correction module 430 operates based on the signal processing algorithms and/or the networks (artificial neural networks) trained through machine learning, the degree of complication or the degree of precision when the target frame is a composite frame may be higher than that when the target frame is a sample frame.

Figure 5:
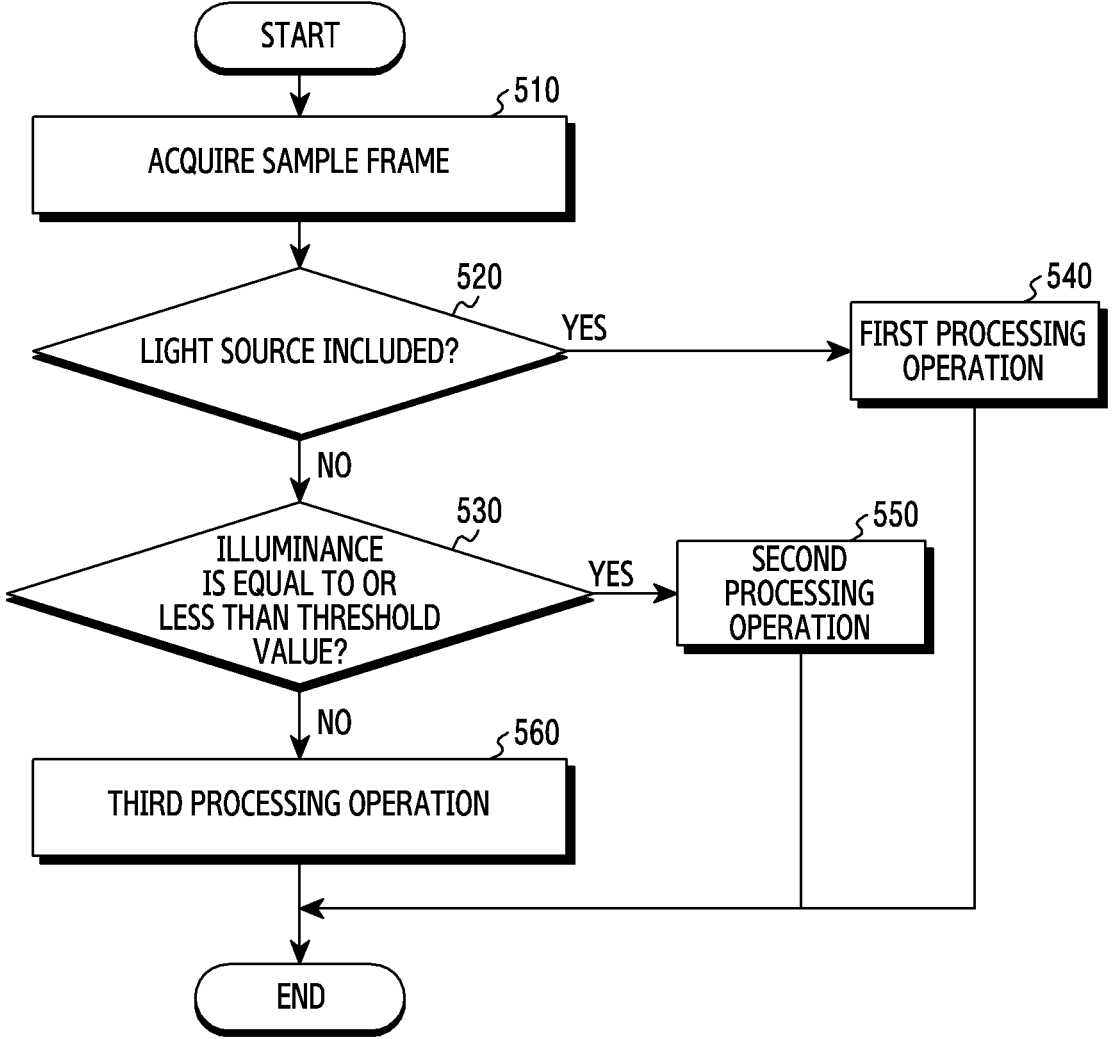
FIG. 5 is a flowchart showing a flow along which an electronic device performs a first processing operation to a third processing operation performed, based on illuminance and whether a light source object is included in an acquired sample frame according to an embodiment of the disclosure.

FIG. 5 is a flowchart showing a flow along which an electronic device performs a first processing operation to a third processing operation, based on illuminance and whether a light source object is included in an acquired sample frame according to an embodiment of the disclosure.

Referring to FIG. 5, in operation 510, an electronic device (e.g., the electronic device 101 in FIG. 1 or 4) may acquire a sample frame according to control of a processor (e.g., the processor 120 in FIG. 1 or 4).

When a user performs execution input for executing a camera application of the electronic device 101 in order to capture an image, the electronic device 101 may activate the camera module 180 according to control of the processor 120 in response to acquisition of the execution input.

The electronic device 101 may acquire, under control of the processor 120, the sample frame by using the camera module 180. For example, the sample frame may be a frame for a preview image which is acquired through the camera module 180 and is displayed on the display 160.

In operation 520, the electronic device (e.g., the electronic device 101) may identify, under control of the processor (e.g., the processor 120), whether a light source object is included in the acquired sample frame. The light source object may be an object such as the sun or a light.

When the electronic device 101 identifies, under control of the processor 120, that the light source object is includes in the sample frame (operation 520—"Yes"), the electronic device 101 may perform a first processing operation according to operation 540.

When the electronic device 101 identifies, under control of the processor 120, that the light source object is not include in the sample frame (operation 520—"No"), the electronic device 101 may perform operation 530.

In operation 540, the electronic device (e.g., the electronic device 101) may perform, under control of the processor (e.g., the processor 120), a processing operation (e.g., the first processing operation) corresponding to the case in which the light source object has been identified.

In operation 530, the electronic device (e.g., the electronic device 101) may identify, under control of the processor (e.g., the processor 120), whether the illuminance of the sample frame is equal to or less than a threshold value (or whether the illuminance is low).

When the electronic device 101 identifies, under control of the processor 120, that the illuminance is equal to or less than the threshold value (or that the illuminance is low) (operation 530—"Yes"), the electronic device 101 may perform a second processing operation according to operation 550. For example, the second processing operation may be a processing operation performed when the processor 120 does not identifies the light source object in the sample frame but identifies low illuminance.

When the electronic device 101 identifies, under control of the processor 120, that the illuminance is not equal to or less than the threshold value (or the illuminance is not low) (operation 530—"No"), the electronic device 101 may perform a third processing operation according to operation 560. For example, the third processing operation may be a processing operation performed when the processor 120 does not identify the light source object in the sample frame and does not identify low illuminance either.

As described above, operations 520 and 530 may be performed serially or in parallel.

Figure 6:
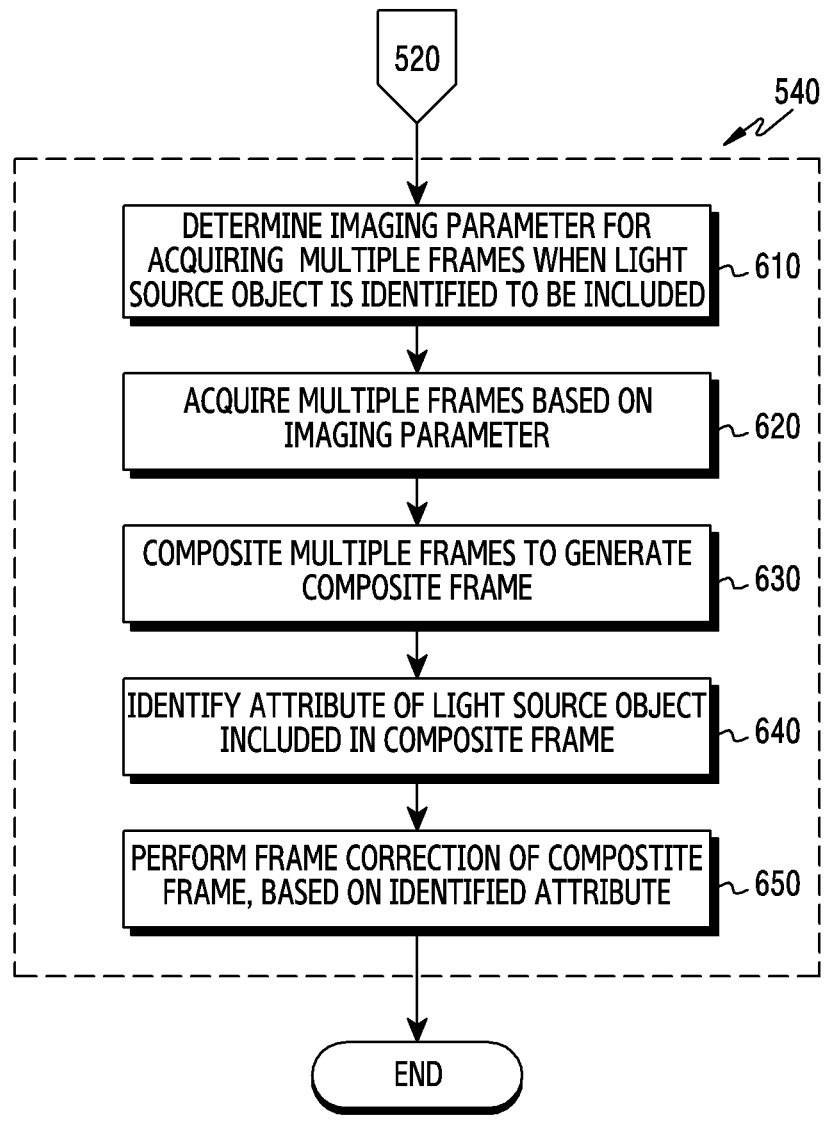
FIG. 6 is a flowchart showing a flow of a first processing operation when a light source is identified in a sample frame acquired by an electronic device according to an embodiment of the disclosure.

FIG. 6 is a flowchart showing a flow of a first processing operation (e.g., operation 540 of FIG. 5) performed when a light source is identified in an acquired sample frame by an electronic device according to an embodiment of the disclosure.

Referring to FIG. 6, in operation 610, when it is determined that a light source object is included in a sample frame, an electronic device (e.g., the electronic device 101 in FIG. 1 or 4) may determine, under control of a processor (e.g., the processor 120 in FIG. 1 or 4), an imaging parameter (e.g., an exposure value, an exposure time, a shutter speed, an aperture value, a focal region, a color temperature, sensitivity, and/or the number (N) of multiple frames) for acquisition of multiple frames.

The electronic device 101 may determine, under control of the processor 120, an imaging parameter (e.g., an exposure value, an exposure time, a shutter speed, an aperture value, a focal region, a color temperature, sensitivity, and/or the number (N) of multiple frames) for acquisition of multiple frames. For example, when it is determined that a light source object is included in a sample frame, the electronic device 101 may reduce an exposure value by adjusting, under control of the processor 120, an exposure time, a shutter speed, an aperture value, a focal region, a color temperature, sensitivity, and/or the number (N) of multiple frames. In another example, the electronic device 101 may also determine, under control of the processor 120, the number of multiple frames to be acquired based on an exposure or an ISO value.

In operation 620, the electronic device (e.g., the electronic device 101) may acquire, under control of the processor (e.g., the processor 120), multiple frames based on the imaging parameter (e.g., the exposure value, the exposure time, the shutter speed, the aperture value, the focal region, the color temperature, the sensitivity, and/or the number (N) of multiple frames.

The electronic device 101 may acquire, under control of the processor 120, multiple frames based on the determined imaging parameter (e.g., the determined exposure value, the determined exposure time, the determined shutter speed, the determined aperture value, the determined focal region, the determined color temperature, the determined sensitivity, and/or the determined number (N) of multiple frames). In this case, the electronic device 101 may acquire, under control of the processor 120, at least one frame having an exposure value at which a pixel value is not saturated.

In operation 630, the electronic device (e.g., the electronic device 101) may composite, under control of the processor (e.g., the processor 120), the multiple frames to generate a composite frame.

The electronic device 101 may composite, under control of the processor 120, the multiple frames acquired based on the determined imaging parameter (e.g., the determined exposure value, the determined exposure time, the determined shutter speed, the determined aperture value, the determined focal region, the determined color temperature, the determined sensitivity, and/or the determined number (N) of multiple frames), and may generate a composite frame through the compositing. For example, the electronic device 101 may extract, under control of the processor 120, identical frame regions, which are determined to be identical regions, from the respective multiple frames, and may composite, based on the extracted identical frame regions, the multiple frames to a composite frame.

In operation 640, the electronic device (e.g., the electronic device 101) may identify, under control of the processor (e.g., the processor 120), attributes of a light source object included in the composite frame.

The electronic device 101 may identify, under control of the processor 120, attributes of the light source object, such as the brightness and color of the light source object or information about an artifact by the light source object.

In operation 650, the electronic device (e.g., the electronic device 101) may perform, under control of the processor (e.g., the processor 120), frame correction of the composite frame, based on the identified attributes.

The electronic device 101 may perform, under control of the processor 120, frame correction of the composite frame, based on the identified attributes of the light source object, such as the brightness and color of the light source object or information about an artifact by the light source object.

The processor 120 (or the image signal processor 260 of FIG. 2) may perform tuning of basic color, brightness, or contrast, such as demosaicing, gamma correction, auto white balance (AWB), or color correction, with respect to a target frame (e.g., a sample frame or a composite frame) of an acquired Bayer domain, thereby generating a frame of the Bayer domain, a YUV domain, or an RGB domain. For convenience of description, the above-mentioned operations of the processor 120 (or the image signal processor 260) may be called "frame tuning".

According to an embodiment of the disclosure, there may be no special limitation on at the timing at which frame tuning is performed. For example, frame tuning may be performed between operations 620 and 630, may be performed between operations 630 and 640, or may be performed after operation 650.

The detailed description of operations 640 and 650 is provided below with respect to operations 710 to 740 in FIG. 7.

Figure 7:
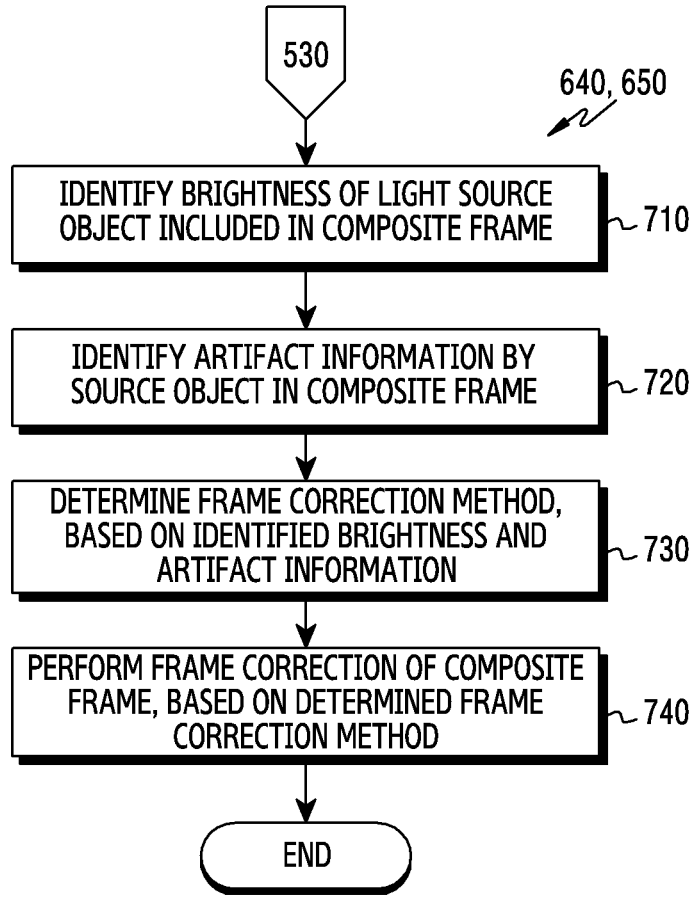
FIG. 7 is a flowchart specifically showing a flow in which an electronic device corrects composite frame in a first processing operation according to an embodiment of the disclosure.

FIG. 7 is a flowchart specifically showing a flow in which an electronic device corrects composite frame in a first processing operation according to an embodiment of the disclosure.

Referring to FIG. 7, operations 710 to 740 in FIG. 7 may be operations specifying operations 640 and operation 650 in FIG. 6.

In operation 710, an electronic device (e.g., the electronic device 101 in FIG. 1 or 4) may identify, under control of a processor (e.g., the processor 120 in FIG. 1 or 4), the brightness of a light source object included in a composite frame.

The electronic device 101 may identify, under control of the processor 120, the brightness of the light source object through an area ratio of a saturation pixel area, which has the maximum pixel value, and a designated pixel area, which has a pixel value equal to or greater than a threshold value and smaller than the maximum pixel value, in the pixel area of an acquired composite frame. For example, as the brightness of the light source object increases, the intensity of glare around the light source object in the composite frame acquired by the electronic device 101 may increase. Furthermore, as the intensity of glare increases, a value of the area ratio may increase, and thus the electronic device 101 may identify, under control of the processor 120, the value of the area ratio, thereby identifying the brightness of the light source object.

The electronic device 101 may identify the brightness of the light source object by identifying, under control of the processor 120, the degree of starburst of the light source object through a method identical or similar to an operation of identifying the brightness of the light source object, based on the above-mentioned intensity of glare.

In operation 720, the electronic device (e.g., the electronic device 101) may identify, under control of the processor (e.g., the processor 120), information about an artifact by the light source object in the composite frame.

Under control of the processor 120, the electronic device 101 may directly identify the artifact information from the composite frame, or may indirectly the artifact information through the position of the light source object included in the composite frame.

The electronic device 101 may identify, under control of the processor 120, the artifact information through segmentation of the composite frame, based on a signal processing algorithm and/or an artificial neural network (AI network) for identifying artifacts.

The electronic device 101 may identify, under control of the processor 120, the position of the light source object in the composite frame, thereby identifying the artifact information (e.g., the presence or absence of artifacts, or the types of artifacts). For example, when the light source object included in the composite frame acquired by the electronic device 101 is present in a designated position, the electronic device 101 may identify (or acquire), under control of the processor 120, artifact information existing in the composite frame. For example, the electronic device 101 may generate, under control of the processor 120, a map for determining the presence or absence and/or the types of artifacts according to the position of the light source object. Furthermore, a memory (e.g., the memory 130 in FIG. 1) may be storing the map. The electronic device 101 may identify, under control of the processor 120, the presence or absence of artifacts and/or the types of artifacts, based on the position of the light source object in the composite frame and the generated map.

The electronic device 101 may identify, under control of the processor 120, artifact information (e.g., the presence or absence of artifacts or the types of artifacts) based on a network trained through a data set regarding the light source object and an environment in which the light source object exists.

In operation 730, the electronic device (e.g., the electronic device 101) may determine, under control of the processor (e.g., the processor 120), a frame correction method based on the identified brightness and the identified artifact information.

In operation 740, the electronic device (e.g., the electronic device 101) may perform frame correction of the composite frame, based on the frame correction method determined under control of the processor (e.g., the processor 120).

The electronic device 101 may determine, under control of the processor 120, that at least one of an image convolution filter type signal processing method and/or a training network method is the frame correction method. For example, in the case of the learning network method, a target frame (e.g., a composite frame) acquired based on a network made of layers overlapped multiple times may be put in as a network input to generate a target frame, and the target frame and ground truth may be compared to train the network. For the balance between speed and performance, the number of overlapped layers may be adjusted, or a method for forming an additional network may be used.

The electronic device 101 may identify, under control of the processor 120, the brightness (or intensity) of the light source object, or the position of the light source object causing artifacts. Furthermore, the electronic device 101 may perform, under control of the processor 120, frame correction for removing an artifact (e.g., a rainbow artifact) occurring when the brightness (or intensity) of the light source object is high and/or an artifact (e.g., flare artifact) caused by optical diffraction of a display (e.g., the display 160).

Figure 8:
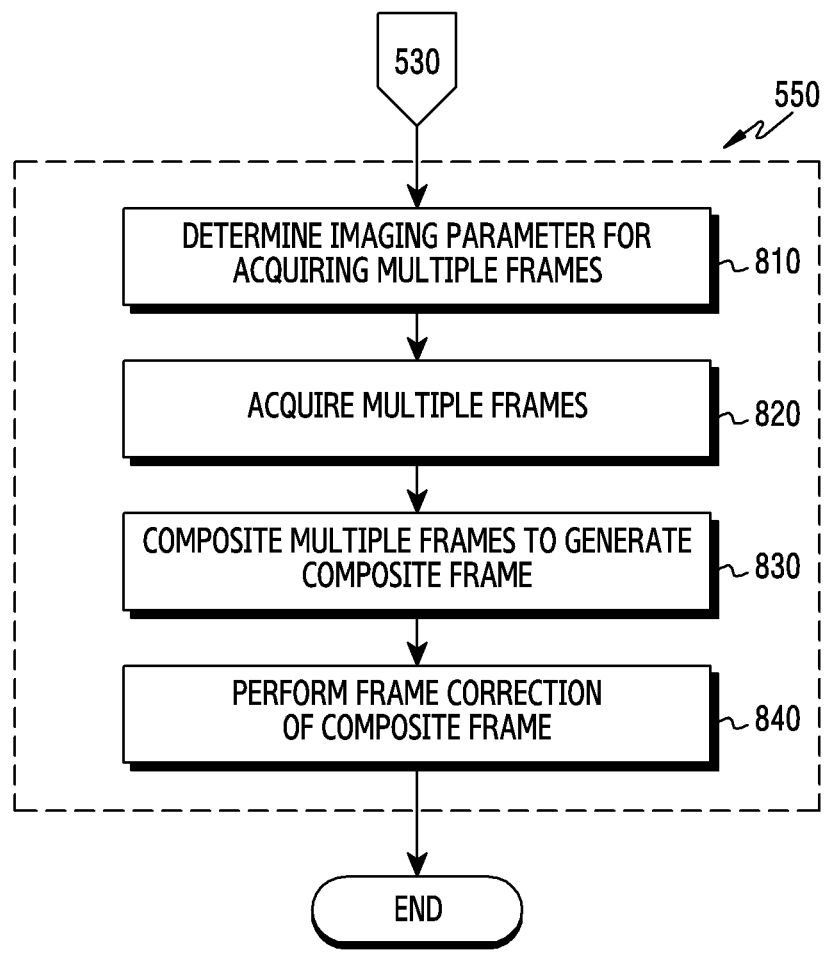
FIG. 8 is a flowchart showing a flow of a second processing operation performed when it is identified that the illuminance of a sample frame acquired by an electronic device is equal to or smaller than a threshold value according to an embodiment of the disclosure.

FIG. 8 is a flowchart showing a flow of a second processing operation (e.g., operation 550 in FIG. 5) performed when the illuminance of a sample frame acquired by an electronic device according to an embodiment is identified to be equal to or less than a threshold value according to an embodiment of the disclosure.

Referring to FIGS. 5 and 8, in operation 530 in FIG. 5, the electronic device (e.g., the electronic device 101) may have identify, under control of the processor (e.g., the processor 120), that the illuminance of the sample frame is equal to or less than the threshold value. When it has been determined that the illuminance of the sample frame is equal to or less than the threshold value, the electronic device 101 may perform a second processing operation (or operation 550), under control of the processor 120.

The second processing operation (or operation 550) may include operations 810 to 840.

In operation 810, an electronic device (e.g., the electronic device 101 in FIG. 1 or 4) may determine, under control of a processor (e.g., the processor 120 in FIG. 1 or 4), an imaging parameter (e.g., an exposure value, an exposure time, a shutter speed, an aperture value, a focal region, a color temperature, sensitivity, and/or the number (N) of multiple frames) for acquisition of multiple frames.

When it is determined that the illuminance of a sample frame is equal to or less than a threshold value, the electronic device 101 may determine, under control of the processor 120, to acquire a plurality of frames (e.g., multiple frames) for SNR improvement. Furthermore, the electronic device 101 may determine, under control of the processor 120, an imaging parameter (e.g., an exposure value, an exposure time, a shutter speed, an aperture value, a focal region, a color temperature, sensitivity, and/or the number (N) of multiple frames) for acquisition of multiple frames. For example, the electronic device 101 may determine, under control of the processor 120, a fixed exposure value for acquisition of multiple frames.

In operation 820, the electronic device (e.g., the electronic device 101) may acquire multiple frames, under control of the processor (e.g., the processor 120).

The electronic device 101 may acquire, under control of the processor 120, a plurality of frames (e.g., multiple frames) based on the determined imaging parameter (e.g., the fixed exposure value).

In operation 830, the electronic device (e.g., the electronic device 101) may composite, under control of the processor (e.g., the processor 120), the multiple frames to generate a composite frame.

The electronic device 101 may generate a composite frame by combining, under control of the processor 120, the multiple frames (e.g., the multiple frame) acquired based on the determined imaging parameter (e.g., the fixed exposure value).

In operation 840, the electronic device (e.g., the electronic device 101) may perform, under control of the processor (e.g., the processor 120), frame correction of the composite frame.

The electronic device 101 may perform, under control of the processor 120, frame correction of the composite frame, based on a signal processing algorithm and/or an artificial neural network (AI network) for frame correction. For example, the electronic device 101 may perform, under control of the processor 120, frame correction based on a signal processing algorithm and/or an artificial neural network (AI network) for removing an effect of optical diffraction on the composite frame. A network for removing an effect caused by the diffraction may be a network performed based on data used during machine learning, and may be identical and/or similar to a network used for frame correction when a light source object having high brightness (intensity) exists.

The processor 120 (or the image signal processor 260 in FIG. 2) may perform tuning of basic color, brightness, or contrast, such as demosaicing, gamma correction, auto white balance (AWB), or color correction, with respect to an acquired target frame (e.g., a sample frame or a composite frame) of a Bayer domain, thereby generating a frame of the Bayer domain, a YUV domain, or an RGB domain. In an embodiment, for convenience of description, the above-mentioned operation of the processor 120 (or the image signal processor 260) may be called "frame tuning".

According to an embodiment of the disclosure, there may be no special limitation on the timing at which frame tuning is performed. For example, the frame tuning may be performed between operations 820 and 830, may be performed between operations 830 and 840, or may be performed after operation 840. In various embodiments, the description of operations of the electronic device 101 regarding the imaging parameter may be identically or similarly applied not only the above-mentioned exposure value, but also to an exposure time, a shutter speed, an aperture value, a focal region, a color temperature, sensitivity, and/or the number (N) of multiple frames.

Figure 9:
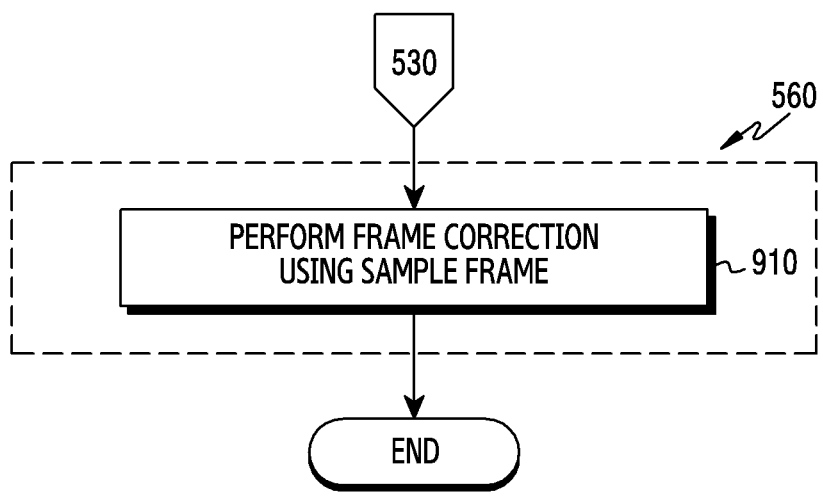
FIG. 9 is a flowchart showing a flow of a third processing operation performed when a light source object is not included in a sample frame acquired by an electronic device and when the illuminance is identified to be not equal to or less than a threshold value according to an embodiment of the disclosure.

FIG. 9 is a flowchart showing a flow of a third processing operation (e.g., operation 560 in FIG. 5) when a light source object is not included in a sample frame acquired by an electronic device and when the illuminance is identified to be not equal to or less than a threshold value according to an embodiment of the disclosure.

Referring to FIG. 9, in operation 910, an electronic device (e.g., the electronic device 101 in FIG. 1 or 4) may perform, under control of a processor (e.g., the processor 120 in FIG. 1 or 4), frame correction using a sample frame.

When a light source object is not included in a sample frame or when the illuminance is identified to be not equal to or less than a threshold value, the electronic device 101 may not need to perform frame correction for SNR improvement and/or removal of an effect caused by the light source object.

The electronic device 101 may perform, under control of the processor 120, frame correction for only distortion due to optical diffraction without needing to acquire multiple frames.

Under control of the processor 120, the electronic device 101 may acquire multiple frames, and may composite the acquired multiple frames.

The electronic device 101 may perform, under control of the processor 120, frame correction based on a signal processing algorithm and/or a network (an artificial neural network) for frame correction with respect to the acquired sample frame or the acquired multiple frames.

The processor 120 (or the image signal processor 260 in FIG. 2) may perform tuning of basic color, brightness, or contrast, such as demosaicing, gamma correction, auto white balance (AWB), or color correction, with respect to an acquired target frame (e.g., a sample frame or a composite frame) of an Bayer domain, thereby generating a frame of the Bayer domain, a YUV domain, or an RGB domain. In an embodiment, for convenience of description, the above-mentioned operation of the processor 120 (or the image signal processor 260) may be called "frame tuning".

According to an embodiment of the disclosure, there may be no limitation on the timing at which frame tuning is performed. For example, frame tuning may be performed between operation 530 and operation 910, or may be performed after operation 910.

Different signal processing algorithms may be applied to the operations (e.g., operation 740, operation 840, and/or operation 910) of performing frame correction by the electronic device 101, and even when the signal processing algorithms are identical, applied parameters may be different from each other. Furthermore, when the signal processing algorithms applied to the electronic device 101 are implemented through networks (artificial neural networks), different network models may be applied to the operations (e.g., operation 740, operation 840, and/or operation 910).

In an electronic device (e.g., the electronic device 101) according to an embodiment of the disclosure, the electronic device (e.g., the electronic device 101) may include a display (e.g., the display 160), a camera module (e.g., the camera module 180) disposed under the display (e.g., the display 160), and a processor (e.g., the processor 120) electrically connected to the display (e.g., the display 160) and the camera module (e.g., the camera module 180). The processor (e.g., the processor 120) acquires a sample frame by using the camera module (e.g., the camera module 180), performs first identification of whether a light source object is included in the sample frame, determines a first imaging parameter for acquisition of multiple frames when the light source object is identified to be included in the sample frame according to the first identification, acquires first multiple frames, based on the first imaging parameter, composites the first multiple frames to generate a first composite frame, identifies an attribute of the light source object included in the first composite frame, and performs first frame correction of the first composite frame, based on the identified attribute.

In the electronic device (e.g., the electronic device 101) according to an embodiment, the first imaging parameter may be at least one among an exposure value, a shutter speed, an aperture value, a focal region, a color temperature, sensitivity, and the number of multiple frames.

In the electronic device (e.g., the electronic device 101) according to an embodiment, the attribute may be at least one of brightness and artifact information of the light source object.

In the electronic device (e.g., the electronic device 101) according to an embodiment, the processor (e.g., the processor 120) may perform second identification of whether illuminance of the sample frame is equal to or less than a threshold value, may determine a second imaging parameter for acquisition of second multiple frames when the illuminance is identified to be equal to or less than the threshold value according to the second identification, may acquire the second multiple frames based on the second imaging parameter, may composite the second multiple frames to generate a second composite frame, and may perform second frame correction of the second composite frame.

In the electronic device (e.g., the electronic device 101) according to an embodiment, the processor (e.g., the processor 120) may parallelly perform the first identification and the second identification.

In the electronic device (e.g., the electronic device 101) according to an embodiment, the second imaging parameter may at least include a fixed exposure value.

In the electronic device (e.g., the electronic device 101) according to an embodiment, the processor (e.g., the processor 120) may identify whether illuminance of the sample frame is equal to or less than a threshold value, and may perform third frame correction by using the sample frame when the illuminance is not identified to be equal to or less than the threshold value.

In the electronic device (e.g., the electronic device 101) according to an embodiment, the processor (e.g., the processor 120) may perform frame tuning for the composite frame.

In the electronic device (e.g., the electronic device 101) according to an embodiment, in identifying whether the light source object is included in the sample frame, the processor (e.g., the processor 120) may identify whether the light source object is included, based on a signal processing algorithm and/or a network (an artificial neural network) trained through machine learning.

In the electronic device (e.g., the electronic device 101) according to an embodiment, the electronic device (e.g., the electronic device 101) may further include a frame analysis module (e.g., the frame analysis module 420) and a frame correction module (e.g., the frame correction module 430), wherein the processor (e.g., the processor 120) performs the first identification, based on the frame analysis module (e.g., the frame analysis module 420), and performs the first frame correction based on the frame correction module (e.g., the frame correction module 430).

An electronic device (e.g., the electronic device 101) according to an embodiment of the disclosure may include a display (e.g., the display 160), a camera module (e.g., the camera module 180) disposed under the display (e.g., the display 160), and a processor (e.g., the processor 120) electrically connected to the display (e.g., the display 160) and the camera module (e.g., the camera module 180), and the processor (e.g., the processor 120) of the electronic device (e.g., the electronic device 101) may be configured to execute acquiring a sample frame by using the camera module (e.g., the camera module 180), performing first identification of whether a light source object is included in the sample frame, determining a first imaging parameter for acquisition of multiple frames when the light source object is identified to be included in the sample frame according to the first identification, acquiring first multiple frames based on the first imaging parameter, compositing the first multiple frames to generate a first composite frame, identifying an attribute of the light source object included in the first composite frame, and performing first frame correction of the first composite frame, based on the identified attribute.

In the method for operating the electronic device (e.g., the electronic device 101) according to an embodiment, the first imaging parameter may be at least one among an exposure value, a shutter speed, an aperture value, a focal region, a color temperature, sensitivity, and the number of multiple frames.

In the method for operating the electronic device (e.g., the electronic device 101) according to an embodiment, the attribute may be at least one of brightness and artifact information of the light source object.

The processor (e.g., the processor 120) may further execute performing second identification of whether illuminance of the sample frame is equal to or less than a threshold value, determining a second imaging parameter for acquisition of second multiple frames when the illuminance is identified to be equal to or less than the threshold value according to the second identification, acquiring the second multiple frames based on the second imaging parameter, compositing the second multiple frames to generate a second composite frame, and performing second frame correction of the second composite frame.

The processor (e.g., the processor 120) may perform the first identification and the second identification in parallel.

In the method for operating the electronic device (e.g., the electronic device 101) according to an embodiment, the second imaging parameter may at least include a fixed exposure value.

The processor (e.g., the processor 120) may further execute identifying whether illuminance of the sample frame is equal to or less than a threshold value, and performing third frame correction by using the sample frame when the illuminance is not identified to be equal to or less than the threshold value.

The processor (e.g., the processor 120) may further execute performing frame tuning for the composite frame.

The processor (e.g., the processor 120) may identify whether the light source object is included, based on a signal processing algorithm and/or a network (an artificial neural network) trained through machine learning, in the identifying whether the light source object is included in the sample frame.

The electronic device (e.g., the electronic device 101) may further include a frame analysis module (e.g., the frame analysis module 420) and a frame correction module (e.g., the frame correction module 430), wherein the processor (e.g., the processor 120) executes performing the first identification, based on the frame analysis module (e.g., the frame analysis module 420), and performing the first frame correction based on the frame correction module (e.g., the frame correction module 430).

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may also be separately disposed in another element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a camera module disposed under the display;
   memory, comprising one or more storage media, storing instructions; and
   at least one processor communicatively coupled to the display and the camera module,
   wherein the instructions, when executed by the at least one processor individually or collectively, cause the electronic device to:

acquire a sample frame by using the camera module, identify whether illuminance of a portion of an area within the sample frame is below a threshold value, based on a result of identifying whether the illuminance of the portion of the area within the sample frame is below the threshold value, perform first identification of whether a light source object is included in the sample frame, determine a first imaging parameter for acquisition of first multiple frames when the light source object is identified to be included in the sample frame according to the first identification, acquire first multiple frames, based on the first imaging parameter, composite the first multiple frames to generate a first composite frame, identify an attribute of the light source object included in the first composite frame, wherein the attribute for the light source object comprises property related to shape of the light source object and color of the light source object, and perform, based on the identified attribute of the light source object, a frame correction of the first composite frame by reducing or eliminating an artifact determined to be caused by the light source object, the frame correction comprising:

identify a portion of the first composite frame whose luminance or color value deviates from surrounding pixels due to the light source object, and adjust the luminance or color value of the identified portion toward an expected pixel value estimated from neighboring pixels.

2. The electronic device of claim 1, wherein the first imaging parameter is at least one of an exposure value, a shutter speed, an aperture value, a focal region, a color temperature, sensitivity, and quantity of the first multiple frames.

3. The electronic device of claim 1, wherein the attribute comprises at least one of brightness and artifact information of the light source object.

4. The electronic device of claim 1, wherein the instructions, when executed by the at least one processor individually or collectively, further cause the electronic device to:

perform second identification of whether illuminance of the sample frame is equal to or less than a threshold value, determine a second imaging parameter for acquisition of second multiple frames when the illuminance is identified to be equal to or less than the threshold value according to the second identification, acquire the second multiple frames, based on the second imaging parameter, composite the second multiple frames to generate a second composite frame, and perform second frame correction of the second composite frame.

5. The electronic device of claim 4, wherein the instructions, when executed by the at least one processor individually or collectively, further cause the electronic device to perform the first identification and the second identification in parallel.

6. The electronic device of claim 4, wherein the second imaging parameter comprises a fixed exposure value.

7. The electronic device of claim 1, wherein the instructions, when executed by the at least one processor individually or collectively, further cause the electronic device to:

identify whether illuminance of the sample frame is equal to or less than a threshold value, and perform third frame correction by using the sample frame when the illuminance is not identified to be equal to or less than the threshold value.

8. The electronic device of claim 1, wherein the instructions, when executed by the at least one processor individually or collectively, further cause the electronic device to perform frame tuning for the composite frame.

9. The electronic device of claim 1, wherein the instructions, when executed by the at least one processor individually or collectively, further cause the electronic device to identify whether the light source object is included, based on at least one of a signal processing algorithm or artificial neural networks trained through machine learning, in identifying whether the light source object is included in the sample frame.

10. The electronic device of claim 1, further comprising:

a frame analysis module comprising a frame analysis circuit; and a frame correction module comprising a frame correction circuit, wherein the instructions, when executed by the at least one processor individually or collectively, further cause the electronic device to:

perform the first identification, based on the frame analysis module, and perform the first frame correction, based on the frame correction module.

11. A method for operating an electronic device, the method comprising:

acquiring a sample frame by using a camera module of the electronic device;

performing first identification of whether a light source object is included in the sample frame;

determining a first imaging parameter for acquisition of first multiple frames when the light source object is identified to be included in the sample frame according to the first identification;

acquiring first multiple frames, based on the first imaging parameter;

identifying whether illuminance of a portion of an area within the sample frame is below a threshold value;

based on a result of identifying whether the illuminance of the portion of the area within the sample frame is below the threshold value, compositing the first multiple frames to generate a first composite frame;

identifying an attribute of the light source object included in the first composite frame, wherein the attribute for the light source object comprises property related to shape of the light source object and color of the light source object; and performing, based on the identified attribute of the light source object, a frame correction of the first composite frame by reducing or eliminating an artifact determined to be caused by the light source object, the frame correction comprising:

identifying a portion of the first composite frame whose luminance or color value deviates from surrounding pixels due to the light source object, and adjusting the luminance or color value of the identified portion toward an expected pixel value estimated from neighboring pixels.

12. The method of claim 11, wherein the first imaging parameter is at least one of an exposure value, a shutter speed, an aperture value, a focal region, a color temperature, sensitivity, and quantity of the first multiple frames.

13. The method of claim 11, wherein the attribute is at least one of brightness and artifact information of the light source object.

14. The method of claim 11, further comprising:

performing second identification of whether illuminance of the sample frame is equal to or less than a threshold value;

determining a second imaging parameter for acquisition of second multiple frames when the illuminance is identified to be equal to or less than the threshold value according to the second identification;

acquiring the second multiple frames, based on the second imaging parameter;

compositing the second multiple frames to generate a second composite frame; and performing second frame correction of the second composite frame.

15. The method of claim 14, wherein the performing of the first identification and the performing of the second identification are performed in parallel.

16. The method of claim 14, wherein the second imaging parameter comprises a fixed exposure value.

17. The method of claim 11, further comprising:

identifying whether illuminance of the sample frame is equal to or less than a threshold value; and performing third frame correction by using the sample frame when the illuminance is not identified to be equal to or less than the threshold value.

18. The method of claim 11, further comprising performing frame tuning for the composite frame.

19. The method of claim 11, wherein the performing of the frame correction comprises:

identifying a frame correction method based on the identified attribute; and performing the frame correction using the identified frame correction method.

20. The method of claim 17, wherein the third frame correction comprises frame correction for only distortion due to optical diffraction.

\* \* \* \* \*